(12) United States Patent
Bhattad et al.

(10) Patent No.: US 9,178,640 B2
(45) Date of Patent: Nov. 3, 2015

(54) DETERMINATION OF NETWORK SYNCHRONIZATION

(75) Inventors: Kapil Bhattad, San Diego, CA (US); Tao Luo, San Diego, CA (US); Taesang Yoo, San Diego, CA (US); Xiaoxia Zhang, San Diego, CA (US); Xiliang Luo, Cardiff, CA (US); Ke Liu, San Diego, CA (US); Durga Prasad Malladi, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 548 days.

(21) Appl. No.: 13/212,829

(22) Filed: Aug. 18, 2011

(65) Prior Publication Data

US 2012/0044928 A1 Feb. 23, 2012

Related U.S. Application Data

(60) Provisional application No. 61/375,749, filed on Aug. 20, 2010.

(51) Int. Cl.
*H04W 56/00* (2009.01)
*H04J 11/00* (2006.01)
*H04B 1/707* (2011.01)
*H04L 5/00* (2006.01)
*H04W 28/04* (2009.01)
(Continued)

(52) U.S. Cl.
CPC ......... *H04J 11/0083* (2013.01); *H04B 1/70718* (2013.01); *H04L 5/0007* (2013.01); *H04W 28/04* (2013.01); *H04W 48/16* (2013.01); *H04W 88/02* (2013.01)

(58) Field of Classification Search
None
See application file for complete search history.

(56) References Cited

U.S. PATENT DOCUMENTS 6,014,548 A    1/2000    Balachandran et al.
6,317,475 B1 *    11/2001    Kasurinen ..................... 375/356
6,847,630 B2    1/2005    Blanz et al.
(Continued)

FOREIGN PATENT DOCUMENTS

CN    101330722 A    12/2008
CN    101562885 A    10/2009
(Continued)

OTHER PUBLICATIONS

Partial International Search Report—PCT/US2011/048423—ISA/EPO—Dec. 1, 2011.
(Continued)

*Primary Examiner* — Chi H Pham
*Assistant Examiner* — Shick Hom
(74) *Attorney, Agent, or Firm* — Norton Rose Fulbright US LLP

(57) ABSTRACT

User equipment (UE) associated with synchronous networks operate in a synchronous mode while UEs associated with asynchronous networks operate in an asynchronous mode. When operating in a synchronous mode, a UE can significantly improve performance of synchronization signal detection, data decoding, and tracking loop management by using the interference cancellation (IC) techniques that are not available in an asynchronous mode of operation. Obtaining synchronization indicators and determining the synchronization status of the current network by UE is disclosed. The determination may be based on the synchronization indicator, whether detected through signal detection, signal measurements, signal analysis, or the like.

50 Claims, 10 Drawing Sheets

(51) Int. Cl.
*H04W 48/16* (2009.01)
*H04W 88/02* (2009.01)

(56) References Cited

U.S. PATENT DOCUMENTS

| | | |
|---|---|---|
| 7,324,479 B2 | 1/2008 | Hur |
| 7,616,721 B2* | 11/2009 | Lee ................................ 375/354 |
| 2001/0005361 A1* | 6/2001 | Lipsanen ....................... 370/238 |
| 2001/0049285 A1 | 12/2001 | Park et al. |
| 2005/0043046 A1 | 2/2005 | Lee |
| 2005/0198396 A1* | 9/2005 | Horne et al. .................. 709/248 |
| 2005/0207350 A1* | 9/2005 | Bloebaum ..................... 370/252 |
| 2006/0031462 A1* | 2/2006 | Xing et al. .................... 709/224 |
| 2007/0191048 A1* | 8/2007 | Catreux-Erceg et al. ..... 455/522 |
| 2007/0280098 A1 | 12/2007 | Bhatt et al. |
| 2008/0020768 A1 | 1/2008 | Li et al. |
| 2008/0167066 A1* | 7/2008 | Yoon et al. ................. 455/550.1 |
| 2009/0116473 A1 | 5/2009 | Lindoff et al. |
| 2009/0117896 A1 | 5/2009 | Baldemair et al. |
| 2009/0147757 A1 | 6/2009 | Naka et al. |
| 2009/0302892 A1* | 12/2009 | Waldrop .......................... 326/93 |
| 2010/0008282 A1 | 1/2010 | Bhattad et al. |
| 2010/0027510 A1 | 2/2010 | Balasubramanian et al. |
| 2010/0118856 A1 | 5/2010 | Krishnamurthy et al. |
| 2010/0142500 A1 | 6/2010 | Sudak |
| 2010/0156710 A1* | 6/2010 | Wirola et al. ............ 342/357.06 |
| 2010/0190447 A1 | 7/2010 | Agrawal et al. |
| 2010/0284286 A1* | 11/2010 | Bourdeaut ..................... 370/252 |
| 2011/0103367 A1 | 5/2011 | Ishii |
| 2011/0176503 A1* | 7/2011 | Patel et al. ..................... 370/329 |
| 2012/0144056 A1* | 6/2012 | Stokking et al. .............. 709/231 |

FOREIGN PATENT DOCUMENTS

| | | |
|---|---|---|
| EP | 1793507 A1 | 6/2007 |
| EP | 2048898 A1 | 4/2009 |
| EP | 2169972 A1 | 3/2010 |
| WO | WO-03043229 A1 | 5/2003 |

OTHER PUBLICATIONS

International Search Report and Written Opinion—PCT/US2011/048423—ISAEPO—Apr. 18, 2012.

European Search Report—EP13189361—Search Authority—The Hague—Nov. 5, 2013.

* cited by examiner

DETERMINATION OF NETWORK SYNCHRONIZATION

CROSS-REFERENCE TO RELATED APPLICATIONS

This application claims the benefit of U.S. Provisional Patent Application No. 61/375,749, entitled, "DETERMINATION OF NETWORK SYNCHRONIZATION", filed on Aug. 20, 2010, which is expressly incorporated by reference herein in its entirety.

BACKGROUND

1. Field

Aspects of the present disclosure relate generally to wireless communication systems, and more particularly, to determination of network synchronization.

2. Background

Wireless communication networks are widely deployed to provide various communication services such as voice, video, packet data, messaging, broadcast, and the like. These wireless networks may be multiple-access networks capable of supporting multiple users by sharing the available network resources. Such networks, which are usually multiple access networks, support communications for multiple users by sharing the available network resources. One example of such a network is the Universal Terrestrial Radio Access Network (UTRAN). The UTRAN is the radio access network (RAN) defined as a part of the Universal Mobile Telecommunications System (UMTS), a third generation (3G) mobile phone technology supported by the 3rd Generation Partnership Project (3GPP). Examples of multiple-access network formats include Code Division Multiple Access (CDMA) networks, Time Division Multiple Access (TDMA) networks, Frequency Division Multiple Access (FDMA) networks, Orthogonal FDMA (OFDMA) networks, and Single-Carrier FDMA (SC-FDMA) networks.

A wireless communication network may include a number of base stations or node Bs that can support communication for a number of user equipments (UEs). A UE may communicate with a base station via downlink and uplink. The downlink (or forward link) refers to the communication link from the base station to the UE, and the uplink (or reverse link) refers to the communication link from the UE to the base station.

A base station may transmit data and control information on the downlink to a UE and/or may receive data and control information on the uplink from the UE. On the downlink, a transmission from the base station may encounter interference due to transmissions from neighbor base stations or from other wireless radio frequency (RF) transmitters. On the uplink, a transmission from the UE may encounter interference from uplink transmissions of other UEs communicating with the neighbor base stations or from other wireless RF transmitters. This interference may degrade performance on both the downlink and uplink.

As the demand for mobile broadband access continues to increase, the possibilities of interference and congested networks grows with more UEs accessing the long-range wireless communication networks and more short-range wireless systems being deployed in communities. Research and development continue to advance the UMTS technologies not only to meet the growing demand for mobile broadband access, but to advance and enhance the user experience with mobile communications.

SUMMARY

Communication networks generally operate in either a synchronous mode or an asynchronous mode. UEs associated with synchronous networks operate in a synchronous mode while UEs associated with asynchronous networks operate in an asynchronous mode. One advantage available with synchronous operation is interference cancellation. When operating in a synchronous mode, a UE can significantly improve performance of synchronization signal (e.g., PSS/SSS) detection, PBCH decoding, data decoding, and tracking loop management by using the interference cancellation (IC) techniques that are not available in an asynchronous mode of operation. The various aspects of the present disclosure provide for the UE to obtain a synchronization indicator and determine the synchronization status of the current network based on the synchronization indicator, whether through signal detection, signal measurements, signal analysis, or the like.

In one aspect of the disclosure, a method of wireless communication includes obtaining a synchronization indicator at a UE and determining a synchronization status of a network in which the UE is located based on the synchronization indicator.

In an additional aspect of the disclosure, an apparatus configured for wireless communication includes means for obtaining a synchronization indicator at a UE and means for determining a synchronization status of a network in which the UE is located based on the synchronization indicator.

In an additional aspect of the disclosure, a computer program product has a non-transitory computer-readable medium having program code recorded thereon. This program code includes code to obtain a synchronization indicator at a UE and code to determine a synchronization status of a network in which the UE is located based on the synchronization indicator.

In an additional aspect of the disclosure, an apparatus includes at least one processor and a memory coupled to the processor. The processor is configured to obtain a synchronization indicator at a UE and to determine a synchronization status of a network in which the UE is located based on the synchronization indicator.

DETAILED DESCRIPTION

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

The techniques described herein may be used for various wireless communication networks such as CDMA, TDMA, FDMA, OFDMA, SC-FDMA and other networks. The terms "network" and "system" are often used interchangeably. A CDMA network may implement a radio technology, such as Universal Terrestrial Radio Access (UTRA), Telecommunications Industry Association's (TIA's) CDMA2000®, and the like. The UTRA technology includes Wideband CDMA (WCDMA) and other variants of CDMA. The CDMA2000® technology includes the IS-2000, IS-95 and IS-856 standards from the Electronics Industry Alliance (EIA) and TIA. A TDMA network may implement a radio technology, such as Global System for Mobile Communications (GSM). An OFDMA network may implement a radio technology, such as Evolved UTRA (E-UTRA), Ultra Mobile Broadband (UMB), IEEE 802.11 (Wi-Fi), IEEE 802.16 (WiMAX), IEEE 802.20, Flash-OFDMA, and the like. The UTRA and E-UTRA technologies are part of Universal Mobile Telecommunication System (UMTS). 3GPP Long Term Evolution (LTE) and LTE-Advanced (LTE-A) are newer releases of the UMTS that use E-UTRA. UTRA, E-UTRA, UMTS, LTE, LTE-A and GSM are described in documents from an organization called the "3rd Generation Partnership Project" (3GPP). CDMA2000® and UMB are described in documents from an organization called the "3rd Generation Partnership Project 2" (3GPP2). The techniques described herein may be used for the wireless networks and radio access technologies mentioned above, as well as other wireless networks and radio access technologies. For clarity, certain aspects of the techniques are described below for LTE or LTE-A (together referred to in the alternative as "LTE/-A") and use such LTE/-A terminology in much of the description below.

Figure 1:
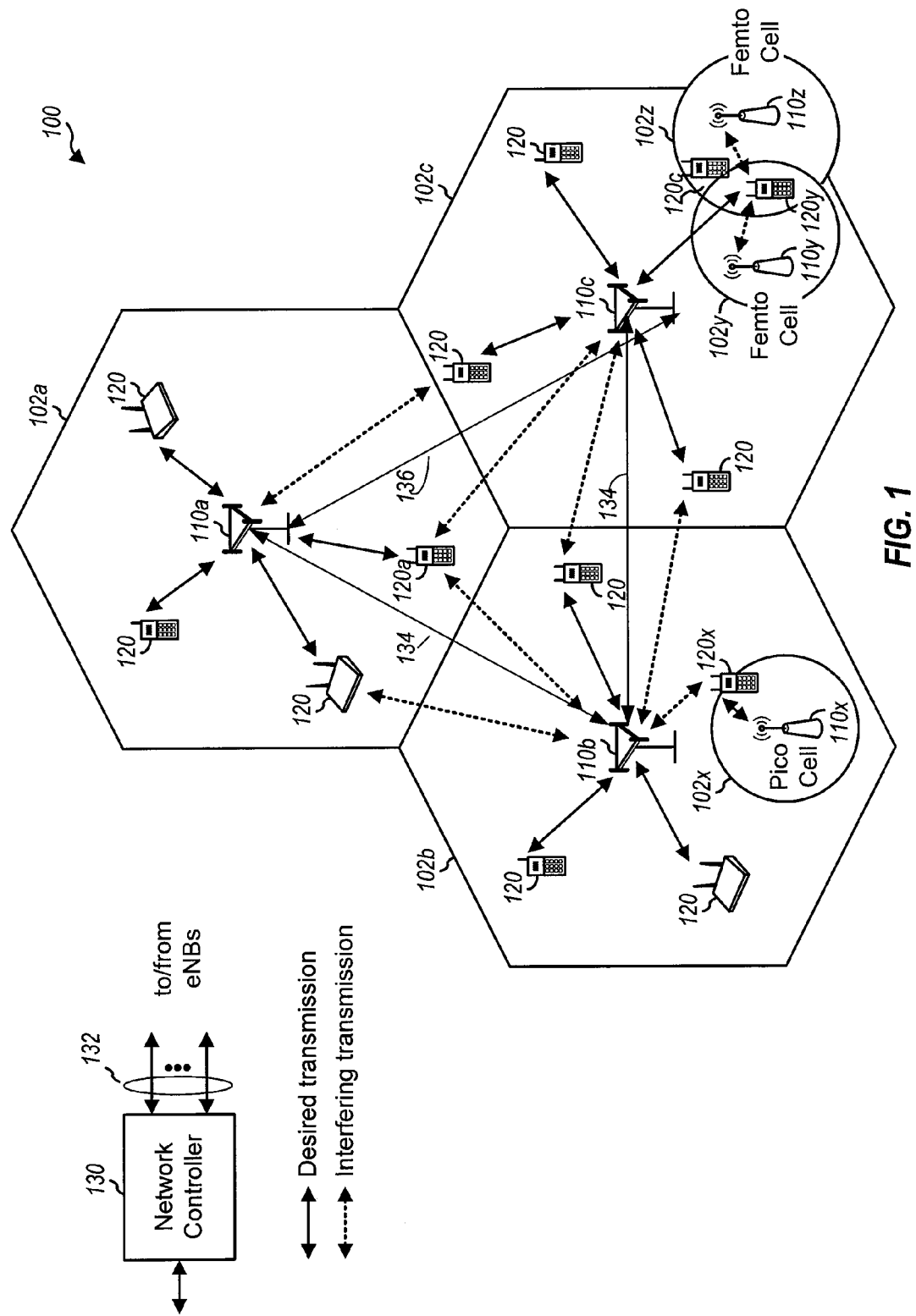
FIG. 1 is a block diagram conceptually illustrating an example of a mobile communication system.

FIG. 1 shows a wireless network 100, which may be an LTE-A network. The wireless network 100 includes a number of evolved node Bs (eNBs) 110 and other network entities. An eNB may be a station that communicates with the UEs and may also be referred to as a base station, a node B, an access point, and the like. Each eNB 110 may provide communication coverage for a particular geographic area. In 3GPP, the term "cell" can refer to this particular geographic coverage area of an eNB and/or an eNB subsystem serving the coverage area, depending on the context in which the term is used.

An eNB may provide communication coverage for a macro cell, a pico cell, a femto cell, and/or other types of cell. A macro cell generally covers a relatively large geographic area (e.g., several kilometers in radius) and may allow unrestricted access by UEs with service subscriptions with the network provider. A pico cell would generally cover a relatively smaller geographic area and may allow unrestricted access by UEs with service subscriptions with the network provider. A femto cell would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). An eNB for a macro cell may be referred to as a macro eNB. An eNB for a pico cell may be referred to as a pico eNB. And, an eNB for a femto cell may be referred to as a femto eNB or a home eNB. In the example shown in FIG. 1, the eNBs 110a, 110b and 110c are macro eNBs for the macro cells 102a, 102b and 102c, respectively. The eNB 110x is a pico eNB for a pico cell 102x. And, the eNBs 110y and 110z are femto eNBs for the femto cells 102y and 102z, respectively. An eNB may support one or multiple (e.g., two, three, four, and the like) cells.

The wireless network 100 may support synchronous or asynchronous operation. For synchronous operation, the eNBs may have similar frame timing, and transmissions from different eNBs may be approximately aligned in time. For asynchronous operation, the eNBs may have different frame timing, and transmissions from different eNBs may not be aligned in time. The techniques described herein may be used for either synchronous or asynchronous operations.

A network controller 130 may couple to a set of eNBs and provide coordination and control for these eNBs. The network controller 130 may communicate with the eNBs 110 via a backhaul 132. The eNBs 110 may also communicate with one another, e.g., directly or indirectly via a wireless backhaul 134 or a wireline backhaul 136.

The UEs 120 are dispersed throughout the wireless network 100, and each UE may be stationary or mobile. A UE may also be referred to as a terminal, a mobile station, a subscriber unit, a station, or the like. A UE may be a cellular phone, a personal digital assistant (PDA), a wireless modem, a wireless communication device, a handheld device, a laptop computer, a cordless phone, a wireless local loop (WLL) station, or the like. A UE may be able to communicate with macro eNBs, pico eNBs, femto eNBs, relays, and the like. In FIG. 1, a solid line with double arrows indicates desired transmissions between a UE and a serving eNB, which is an eNB designated to serve the UE on the downlink and/or uplink. A dashed line with double arrows indicates interfering transmissions between a UE and an eNB.

LTE/-A utilizes orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, or the like. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, K may be equal to 128, 256, 512, 1024 or 2048 for a corresponding system bandwidth of 1.25, 2.5, 5, 10 or 20 megahertz (MHz), respectively. The system bandwidth may also be partitioned into sub-bands. For example, a sub-band may cover 1.08 MHz, and there may be 1, 2, 4, 8 or 16 sub-bands for a corresponding system bandwidth of 1.25, 2.5, 5, or 20 MHz, respectively.

Figure 2:
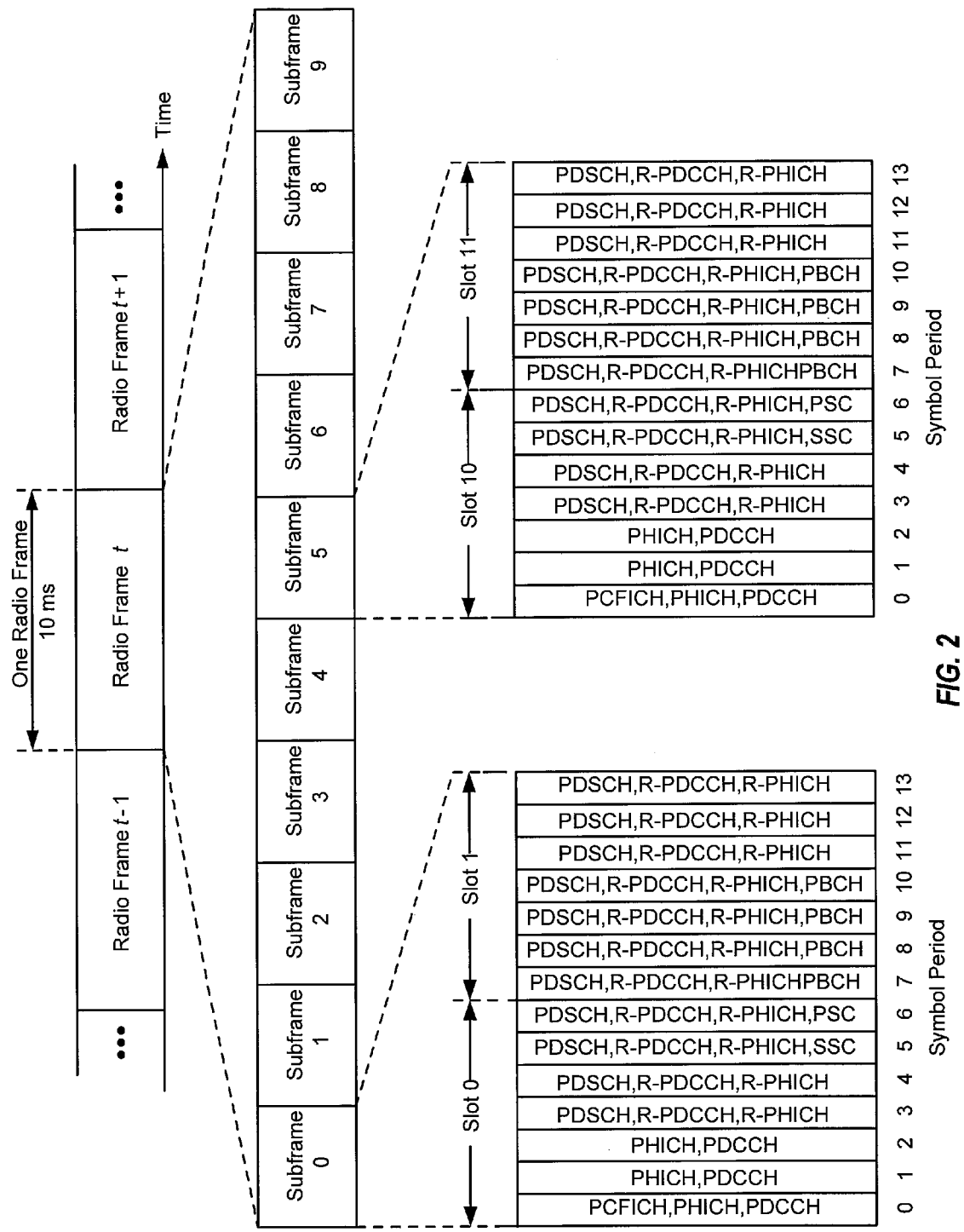
FIG. 2 is a block diagram conceptually illustrating an example of a downlink frame structure in a mobile communication system.

FIG. 2 shows a downlink frame structure used in LTE/-A. The transmission timeline for the downlink may be partitioned into units of radio frames. Each radio frame may have a predetermined duration (e.g., 10 milliseconds (ms)) and may be partitioned into 10 subframes with indices of 0 through 9. Each subframe may include two slots. Each radio frame may thus include 20 slots with indices of 0 through 19. Each slot may include L symbol periods, e.g., 7 symbol periods for a normal cyclic prefix (as shown in FIG. 2) or 6 symbol periods for an extended cyclic prefix. The 2L symbol periods in each subframe may be assigned indices of 0 through 2L−1. The available time frequency resources may be partitioned into resource blocks. Each resource block may cover N subcarriers (e.g., 12 subcarriers) in one slot.

In LTE/-A, an eNB may send a primary synchronization signal (PSS) and a secondary synchronization signal (SSS) for each cell in the eNB. The primary and secondary synchronization signals may be sent in symbol periods 6 and 5, respectively, in each of subframes 0 and 5 of each radio frame with the normal cyclic prefix, as shown in FIG. 2. The synchronization signals may be used by UEs for cell detection and acquisition. The eNB may send a Physical Broadcast Channel (PBCH) in symbol periods 0 to 3 in slot 1 of subframe 0. The PBCH may carry certain system information.

The eNB may send a Physical Control Format Indicator Channel (PCFICH) in the first symbol period of each subframe, as seen in FIG. 2. The PCFICH may convey the number of symbol periods (M) used for control channels, where M may be equal to 1, 2 or 3 and may change from subframe to subframe. M may also be equal to 4 for a small system bandwidth, e.g., with less than 10 resource blocks. In the example shown in FIG. 2, M=3. The eNB may send a Physical HARQ Indicator Channel (PHICH) and a Physical Downlink Control Channel (PDCCH) in the first M symbol periods of each subframe. The PDCCH and PHICH are also included in the first three symbol periods in the example shown in FIG. 2. The PHICH may carry information to support hybrid automatic retransmission (HARQ). The PDCCH may carry information on resource allocation for UEs and control information for downlink channels. The eNB may send a Physical Downlink Shared Channel (PDSCH) in the remaining symbol periods of each subframe. The PDSCH may carry data for UEs scheduled for data transmission on the downlink.

In addition to sending PHICH and PDCCH in the control section of each subframe, i.e., the first symbol period of each subframe, an LTE-A device may also transmit these control-oriented channels in the data portions of each subframe as well. As shown in FIG. 2, these new control designs utilizing the data region, e.g., the Relay-Physical Downlink Control Channel (R-PDCCH) and Relay-Physical HARQ Indicator Channel (R-PHICH) are included in the later symbol periods of each subframe. The R-PDCCH is a new type of control channel utilizing the data region originally developed in the context of half-duplex relay operation. Different from legacy PDCCH and PHICH, which occupy the first several control symbols in one subframe, R-PDCCH and R-PHICH are mapped to resource elements (REs) originally designated as the data region. The new control channel may be in the form of Frequency Division Multiplexing (FDM), Time Division Multiplexing (TDM), or a combination of FDM and TDM.

The eNB may send the PSS, SSS and PBCH in the center 1.08 MHz of the system bandwidth used by the eNB. The eNB may send the PCFICH and PHICH across the entire system bandwidth in each symbol period in which these channels are sent. The eNB may send the PDCCH to groups of UEs in certain portions of the system bandwidth. The eNB may send the PDSCH to specific UEs in specific portions of the system bandwidth. The eNB may send the PSS, SSS, PBCH, PCFICH and PHICH in a broadcast manner to all UEs, may send the PDCCH in a unicast manner to specific UEs, and may also send the PDSCH in a unicast manner to specific UEs.

Referring back to FIG. 1, the wireless network 100 uses the diverse set of eNBs 110 (i.e., macro eNBs, pico eNBs, femto eNBs, and relays) to improve the spectral efficiency of the system per unit area. Because the wireless network 100 uses such different eNBs for its spectral coverage, it may also be referred to as a heterogeneous network. The macro eNBs 110a-c are usually carefully planned and placed by the provider of the wireless network 100. The macro eNBs 110a-c generally transmit at high power levels (e.g., 5 W-40 W). The pico eNB 110x and the relay station 110r, which generally transmit at substantially lower power levels (e.g., 100 mW-2 W), may be deployed in a relatively unplanned manner to eliminate coverage holes in the coverage area provided by the macro eNBs 110a-c and improve capacity in the hot spots. The femto eNBs 110y-z, which are typically deployed independently from the wireless network 100 may, nonetheless, be incorporated into the coverage area of the wireless network 100 either as a potential access point to the wireless network 100, if authorized by their administrator(s), or at least as an active and aware eNB that may communicate with the other eNBs 110 of the wireless network 100 to perform resource coordination and coordination of interference management. The femto eNBs 110y-z typically also transmit at substantially lower power levels (e.g., 100 mW-2 W) than the macro eNBs 110a-c.

In operation of a heterogeneous network, such as the wireless network 100, each UE is usually served by the eNB 110 with the better signal quality, while the unwanted signals received from the other eNBs 110 are treated as interference. While such operational principals can lead to significantly sub-optimal performance, gains in network performance are realized in the wireless network 100 by using intelligent resource coordination among the eNBs 110, better server selection strategies, and more advanced techniques for efficient interference management.

A pico eNB, such as the pico eNB 110x, is characterized by a substantially lower transmit power when compared with a macro eNB, such as the macro eNBs 110a-c. A pico eNB will also usually be placed around a network, such as the wireless network 100, in an ad hoc manner. Because of this unplanned deployment, wireless networks with pico eNB placements, such as the wireless network 100, can be expected to have large areas with low signal to interference conditions, which can make for a more challenging RF environment for control channel transmissions to UEs on the edge of a coverage area or cell (a "cell-edge" UE). Moreover, the potentially large disparity (e.g., approximately 20 dB) between the transmit power levels of the macro eNBs 110a-c and the pico eNB 110x implies that, in a mixed deployment, the downlink coverage area of the pico eNB 110x will be much smaller than that of the macro eNBs 110a-c.

In the uplink case, however, the signal strength of the uplink signal is governed by the UE, and, thus, will be similar when received by any type of the eNBs 110. With the uplink coverage areas for the eNBs 110 being roughly the same or similar, uplink handoff boundaries will be determined based on channel gains. This can lead to a mismatch between downlink handover boundaries and uplink handover boundaries. Without additional network accommodations, the mismatch would make the server selection or the association of UE to eNB more difficult in the wireless network 100 than in a macro eNB-only homogeneous network, where the downlink and uplink handover boundaries are more closely matched.

If server selection is based predominantly on downlink received signal strength, the usefulness of mixed eNB deployment of heterogeneous networks, such as the wireless network 100, will be greatly diminished. This is because the larger coverage area of the higher powered macro eNBs, such as the macro eNBs 110a-c, limits the benefits of splitting the cell coverage with the pico eNBs, such as the pico eNB 110x, because, the higher downlink received signal strength of the macro eNBs 110a-c will attract all of the available UEs, while the pico eNB 110x may not be serving any UE because of its much weaker downlink transmission power. Moreover, the macro eNBs 110a-c will likely not have sufficient resources to efficiently serve those UEs. Therefore, the wireless network 100 will attempt to actively balance the load between the macro eNBs 110a-c and the pico eNB 110x by expanding the coverage area of the pico eNB 110x. This concept is referred to as range extension.

The wireless network 100 achieves this range extension by changing the manner in which server selection is determined. Instead of basing server selection on downlink received signal strength, selection is based more on the quality of the downlink signal. In one such quality-based determination, server selection may be based on determining the eNB that offers the minimum path loss to the UE. Additionally, the wireless network 100 provides a fixed partitioning of resources equally between the macro eNBs 110a-c and the pico eNB 110x. However, even with this active balancing of load, downlink interference from the macro eNBs 110a-c should be mitigated for the UEs served by the pico eNBs, such as the pico eNB 110x. This can be accomplished by various methods, including interference cancellation at the UE, resource coordination among the eNBs 110, or the like.

In a heterogeneous network with range extension, such as the wireless network 100, in order for UEs to obtain service from the lower-powered eNBs, such as the pico eNB 110x, in the presence of the stronger downlink signals transmitted from the higher-powered eNBs, such as the macro eNBs 110a-c, the pico eNB 110x engages in control channel and data channel interference coordination with the dominant interfering ones of the macro eNBs 110a-c. Many different techniques for interference coordination may be employed to manage interference. For example, inter-cell interference coordination (ICIC) may be used to reduce interference from cells in co-channel deployment. One ICIC mechanism is adaptive resource partitioning. Adaptive resource partitioning assigns subframes to certain eNBs. In subframes assigned to a first eNB, neighbor eNBs do not transmit. Thus, interference experienced by a UE served by the first eNB is reduced. Subframe assignment may be performed on both the uplink and downlink channels.

For example, subframes may be allocated between three classes of subframes: protected subframes (U subframes), prohibited subframes (N subframes), and common subframes (C subframes). Protected subframes are assigned to a first eNB for use exclusively by the first eNB. Protected subframes may also be referred to as "clean" subframes based on the lack of interference from neighboring eNBs. Prohibited subframes are subframes assigned to a neighbor eNB, and the first eNB is prohibited from transmitting data during the prohibited subframes. For example, a prohibited subframe of the first eNB may correspond to a protected subframe of a second interfering eNB. Thus, the first eNB is the only eNB transmitting data during the first eNB's protected subframe. Common subframes may be used for data transmission by multiple eNBs. Common subframes may also be referred to as "unclean" subframes because of the possibility of interference from other eNBs.

At least one protected subframe is statically assigned per period. In some cases only one protected subframe is statically assigned. For example, if a period is 8 milliseconds, one protected subframe may be statically assigned to an eNB during every 8 milliseconds. Other subframes may be dynamically allocated.

Adaptive resource partitioning information (ARPI) allows the non-statically assigned subframes to be dynamically allocated. Any of protected, prohibited, or common subframes may be dynamically allocated (AU, AN, AC subframes, respectively). The dynamic assignments may change quickly, such as, for example, every one hundred milliseconds or less.

Figure 3:
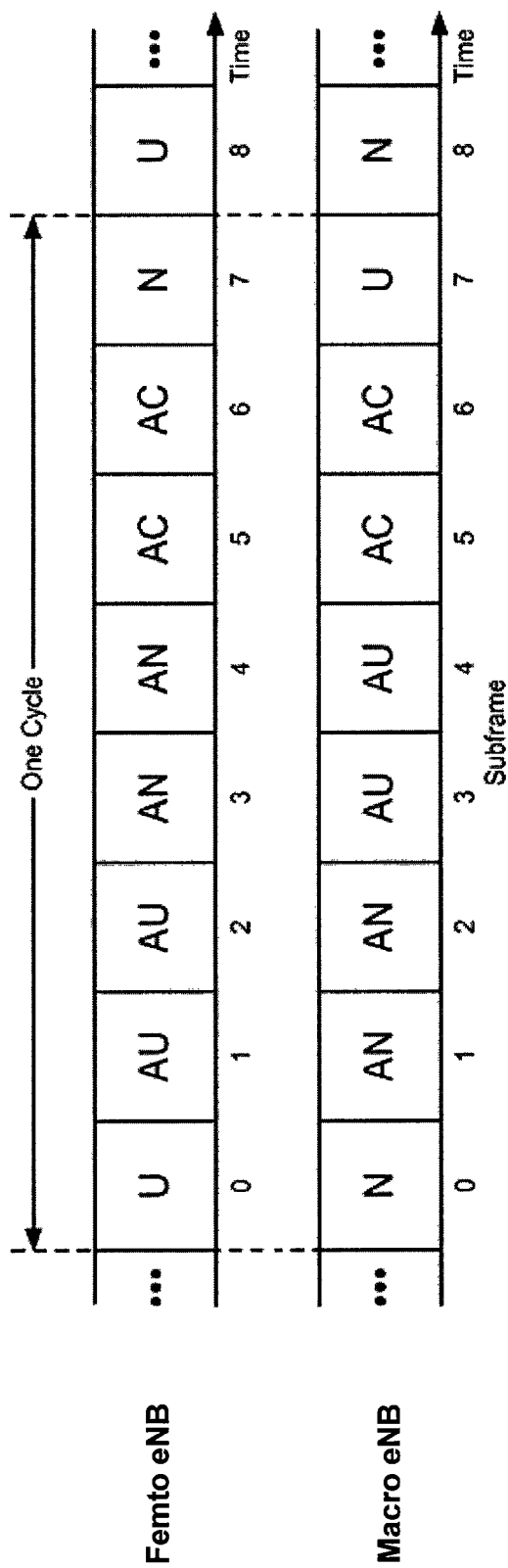
FIG. 3 is a block diagram conceptually illustrating time division multiplexed (TDM) partitioning in a heterogeneous network according to one aspect of the disclosure.

FIG. 3 is a block diagram illustrating time division multiplexed (TDM) partitioning in a heterogeneous network according to one aspect of the disclosure. A first row of blocks illustrate subframe assignments for a femto eNB, and a second row of blocks illustrate subframe assignments for a macro eNB. Each of the eNBs has a static protected subframe during which the other eNB has a static prohibited subframe. For example, the femto eNB has a protected subframe (U subframe) in subframe 0 corresponding to a prohibited subframe (N subframe) in subframe 0. Likewise, the macro eNB has a protected subframe (U subframe) in subframe 7 corresponding to a prohibited subframe (N subframe) in subframe 7. Subframes 1-6 are dynamically assigned as either protected subframes (AU), prohibited subframes (AN), and common subframes (AC). During the dynamically assigned common subframes (AC) in subframes 5 and 6, both the femto eNB and the macro eNB may transmit data.

Protected subframes (such as U/AU subframes) have reduced interference and a high channel quality because aggressor eNBs are prohibited from transmitting. Prohibited subframes (such as N/AN subframes) have no data transmission to allow victim eNBs to transmit data with low interference levels. Common subframes (such as C/AC subframes) have a channel quality dependent on the number of neighbor eNBs transmitting data. For example, if neighbor eNBs are transmitting data on the common subframes, the channel quality of the common subframes may be lower than the protected subframes. Channel quality on common subframes may also be lower for extended boundary area (EBA) UEs strongly affected by aggressor eNBs. An EBA UE may belong to a first eNB but also be located in the coverage area of a second eNB. For example, a UE communicating with a macro eNB that is near the range limit of a femto eNB coverage is an EBA UE.

Figure 4:
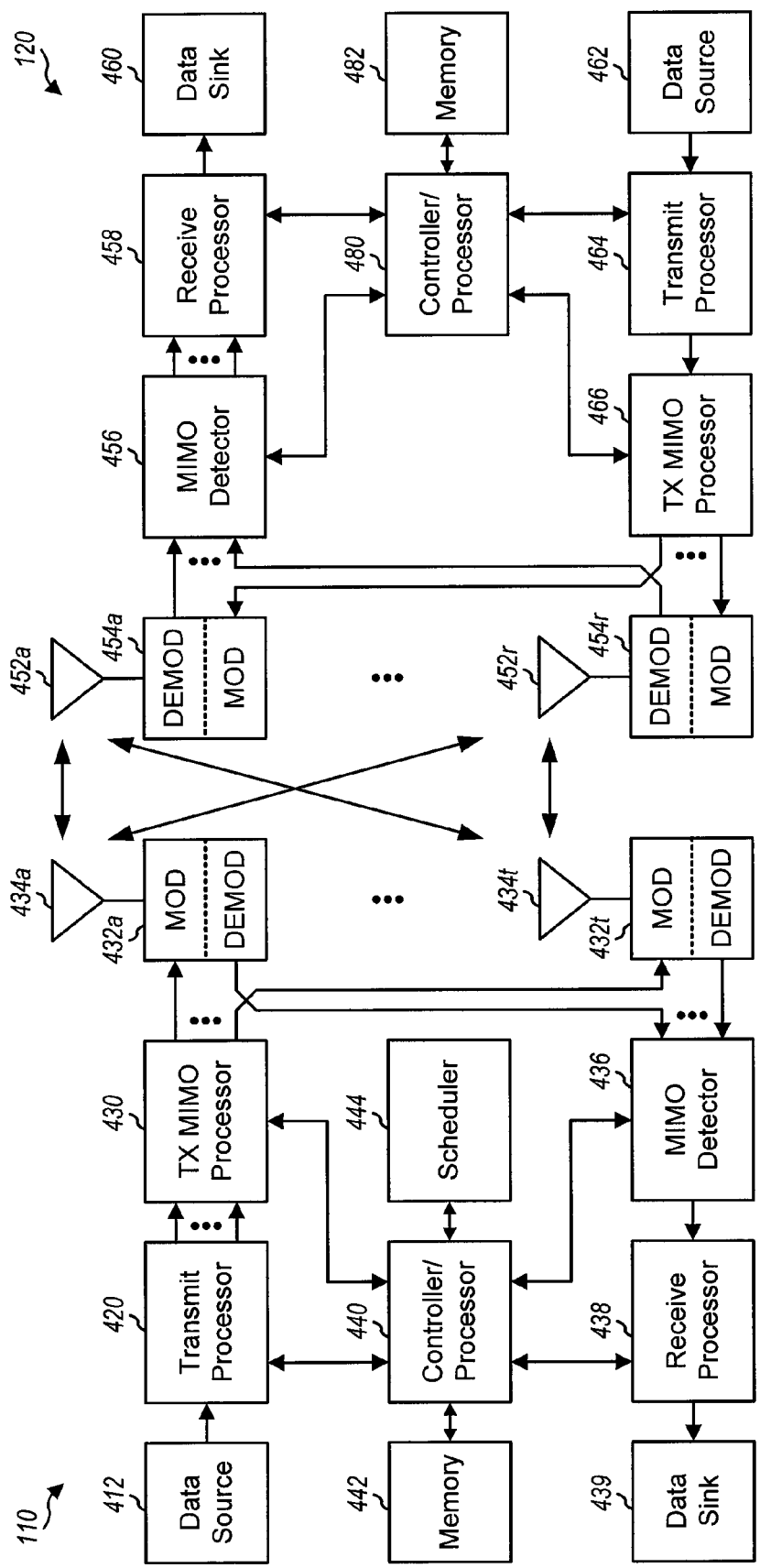
FIG. 4 is a block diagram conceptually illustrating a design of a base station/eNB and a UE configured according to one aspect of the present disclosure.

FIG. 4 shows a block diagram of a design of a base station/eNB 110 and a UE 120, which may be one of the base stations/eNBs and one of the UEs in FIG. 1. For a restricted association scenario, the eNB 110 may be the macro eNB 110c in FIG. 1, and the UE 120 may be the UE 120y. The eNB 110 may also be a base station of some other type. The eNB 110 may be equipped with antennas 434a through 434t, and the UE 120 may be equipped with antennas 452a through 452r.

At the eNB 110, a transmit processor 420 may receive data from a data source 412 and control information from a controller/processor 440. The control information may be for the PBCH, PCFICH, PHICH, PDCCH, etc. The data may be for the PDSCH, etc. The processor 420 may process (e.g., encode and symbol map) the data and control information to obtain data symbols and control symbols, respectively. The processor 420 may also generate reference symbols, e.g., for the PSS, SSS, and cell-specific reference signal. A transmit (TX) multiple-input multiple-output (MIMO) processor 430 may perform spatial processing (e.g., precoding) on the data symbols, the control symbols, and/or the reference symbols, if applicable, and may provide output symbol streams to the modulators (MODs) 432a through 432t. Each modulator 432 may process a respective output symbol stream (e.g., for OFDM, etc.) to obtain an output sample stream. Each modulator 432 may further process (e.g., convert to analog, amplify, filter, and upconvert) the output sample stream to obtain a downlink signal. Downlink signals from modulators 432a through 432t may be transmitted via the antennas 434a through 434t, respectively.

At the UE 120, the antennas 452a through 452r may receive the downlink signals from the eNB 110 and may provide received signals to the demodulators (DEMODs) 454a through 454r, respectively. Each demodulator 454 may condition (e.g., filter, amplify, downconvert, and digitize) a respective received signal to obtain input samples. Each demodulator 454 may further process the input samples (e.g., for OFDM, etc.) to obtain received symbols. A MIMO detector 456 may obtain received symbols from all the demodulators 454a through 454r, perform MIMO detection on the received symbols if applicable, and provide detected symbols. A receive processor 458 may process (e.g., demodulate, deinterleave, and decode) the detected symbols, provide decoded data for the UE 120 to a data sink 460, and provide decoded control information to a controller/processor 480.

On the uplink, at the UE 120, a transmit processor 464 may receive and process data (e.g., for the PUSCH) from a data source 462 and control information (e.g., for the PUCCH) from the controller/processor 480. The processor 464 may also generate reference symbols for a reference signal. The symbols from the transmit processor 464 may be precoded by a TX MIMO processor 466 if applicable, further processed by the demodulators 454a through 454r (e.g., for SC-FDM, etc.), and transmitted to the eNB 110. At the eNB 110, the uplink signals from the UE 120 may be received by the antennas 434, processed by the modulators 432, detected by a MIMO detector 436 if applicable, and further processed by a receive processor 438 to obtain decoded data and control information sent by the UE 120. The processor 438 may provide the decoded data to a data sink 439 and the decoded control information to the controller/processor 440.

The controllers/processors 440 and 480 may direct the operation at the eNB 110 and the UE 120, respectively. The processor 440 and/or other processors and modules at the eNB 110 may perform or direct the execution of various processes for the techniques described herein. The processor 480 and/or other processors and modules at the UE 120 may also perform or direct the execution of the functional blocks illustrated in FIGS. 3 and 4, and/or other processes for the techniques described herein. The memories 442 and 482 may store data and program codes for the eNB 110 and the UE 120, respectively. A scheduler 444 may schedule UEs for data transmission on the downlink and/or uplink.

Communication networks generally operate in either a synchronous mode or an asynchronous mode. Therefore, UEs of synchronous networks operate in a synchronous mode while UEs of asynchronous networks operate in an asynchronous mode. One advantage available with synchronous operation is interference cancellation. When operating in a synchronous mode, a UE can significantly improve performance of synchronization signal (e.g., PSS/SSS) detection, PBCH decoding, data decoding, and tracking loop management by using the interference cancellation techniques available in a synchronous mode of operation.

Figure 5:
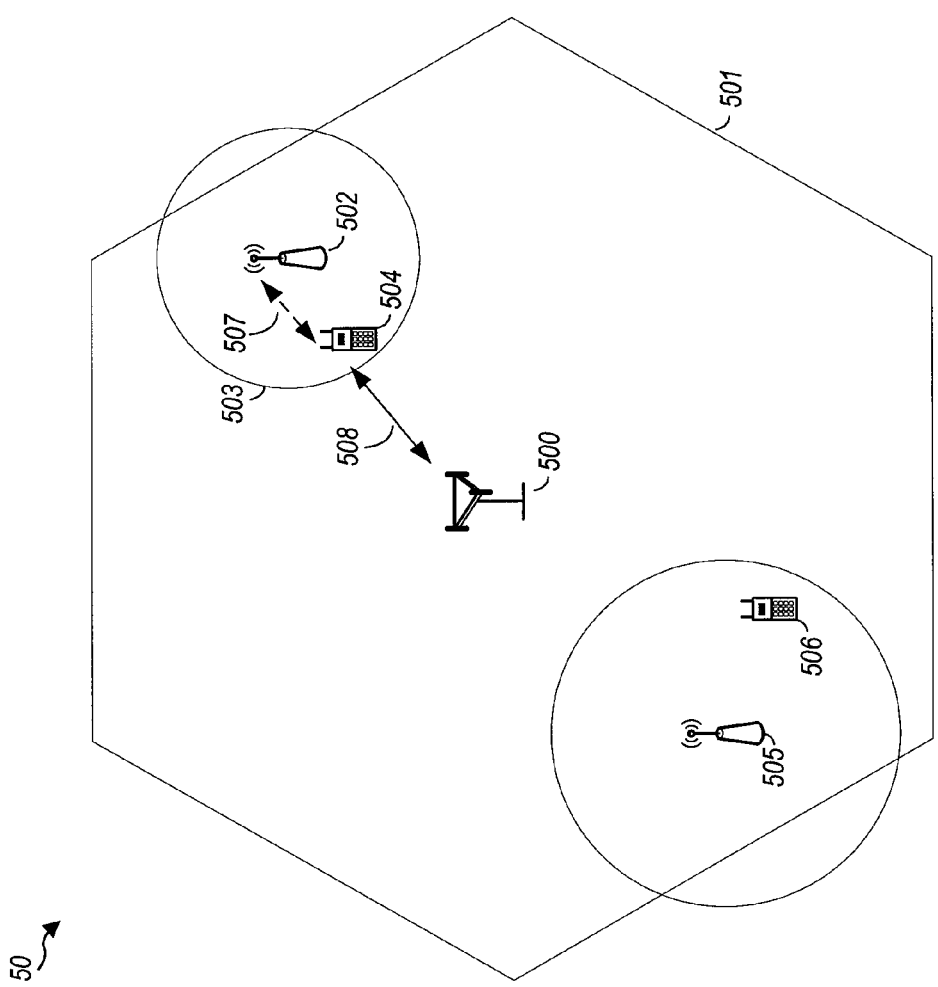
FIG. 5 is a block diagram illustrating a cell of a network configured according to one aspect of the present disclosure.

FIG. 5 is a block diagram illustrating a cell 501 of a network 50 configured according to one aspect of the present disclosure. The cell 501 is serviced by a macro eNB 500 and pico eNBs 502 and 505. UEs that enter the cell 501, such as UEs 504 and 506, will attempt to detect the synchronization of the cell 501 by obtaining a synchronization indicator. For purposes of this application, a synchronization indicator comprises information that would suggest the synchronization of the cell 501 with respect to the network. Using this synchronization indicator, the UEs, such as the UEs 504 and 506 will determine the synchronization status of the network 50.

Various methods may be used by the UEs, such as UE 504, to obtain this synchronization indicator. For example, the UE 504 detects the signal 508 from the macro eNB 500. In analyzing the signal 508, the UE 504 detects a particular signal that is indicative or unique to one type of synchronization.

Cross-Subframe Signaling

In one instance, this particular signal is a cross-subframe assignment detected while the cell 501 operates in a frequency division duplex (FDD) mode. The UE 504, therefore, concludes that such cross-subframe assignments in an FDD mode are unique to synchronous systems, and determines that the network 50 is operating in a synchronous mode. The UE 504 may then switch itself into synchronous mode and take advantage of the interference cancellation techniques in performing its operations.

TDD Network Detection

In another example, if the UE 504 detects that the cell 501 is operating in a time division duplex (TDD) mode, the UE 504 would again conclude that the network 50 is operating in a synchronous mode because the TDD mode only operates in synchronous systems.

Time Division Multiplexing Partitioning

In yet another example, the UE 504 may detect resource partitioning in the cell 501. Again, resource partitioning, such as time division multiplex (TDM) partitioning, is indicative of a synchronous system. Therefore, on detecting the resource partitioning, the UE 504 will determine that the network 50 is operating in a synchronous mode and switch itself into synchronous mode.

Base Station Signaling

Figure 6B:
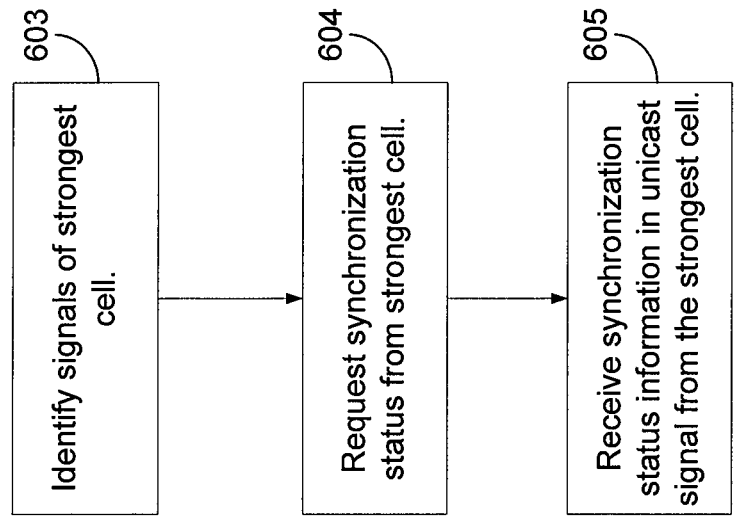
FIGS. 6-9 are functional block diagrams illustrating example blocks executed to implement various aspects of the present disclosure.
Figure 6A:
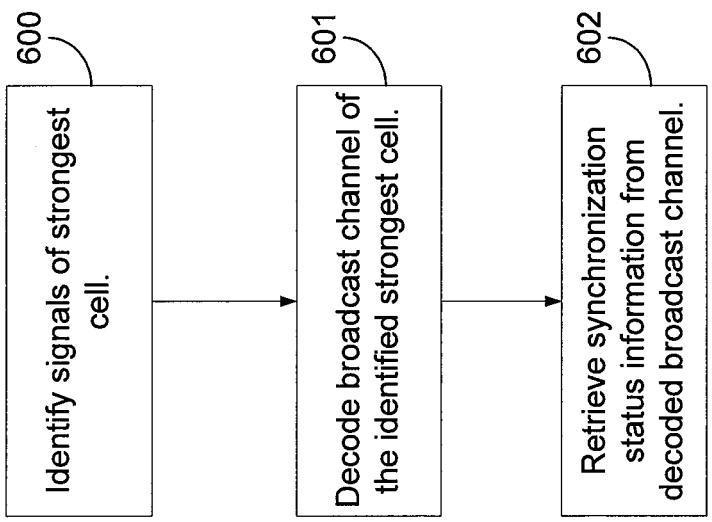

The synchronization status of a network, such as the network 50, may also be transmitted from the macro eNB 500. The macro eNB 500 may broadcast the synchronization status, for example, as a sync flag in the reserved field of a broadcast channel, such as the PBCH. FIG. 6A is a functional block diagram illustrating example blocks implementing a base station broadcasting aspect of the present disclosure. Once the UE 504 would acquire the strongest cell, in block 600, it could decode the broadcast channel, in block 601, and retrieve the sync flag as it synchronization indicator, in block 602, in order to make the determination of the synchronization status of the network 50. Similarly, instead of broadcasting the synchronization status, the UE 504 may request this information from the macro eNB 500. FIG. 6B is a functional block diagram illustrating example blocks implementing a base station unicast aspect of the present disclosure. In block 603, the UE 504 would acquire the strongest cell, macro eNB 500. The UE 504 would then request the synchronization status information from macro eNB 500, in block 604. The macro eNB 500 would then unicast this information to the UE 504, in block 605.

Cross-Cell Synchronization Signal Detection

Figures 7, 8:
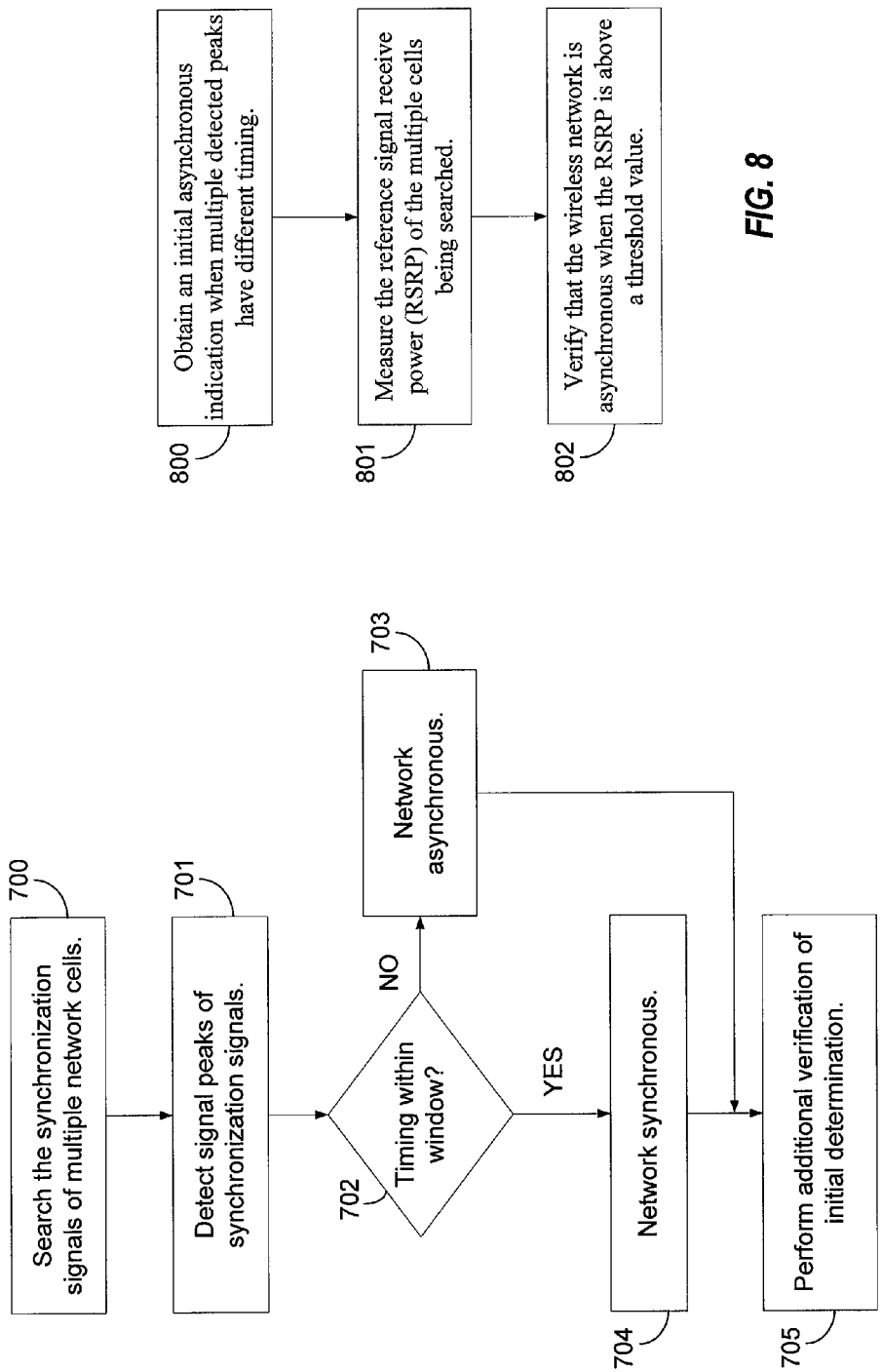

In an additional aspect of the present disclosure, a UE may obtain a synchronization indicator by analyzing signals across multiple cells or neighboring cells. Referring back to FIG. 1, the UE 120a is currently located in the macro cell 102a. However, in normal operation, the UE 120a would periodically search and analyze various signals from the neighboring cells, such as the macro cells 102b and 102c. As a part of this neighbor cell search, the UE 120a may obtain a synchronization indicator that enables the UE 120a to determine the synchronization status of the wireless network 100. FIG. 7 is a functional block diagram illustrating example blocks to implement a cross-cell signal detection aspect of the present disclosure. For example, the UE 120a would search the synchronization signals (e.g., PSS/SSS) of the neighboring cells, the macro cells 102b and 102c, in block 700. After detecting the signal peaks of the synchronization signals in block 701, a determination is made, in block 702, whether the differences in the timing of the signal peaks falls within a threshold timing window. If the UE 120a detects the synchronization signals for the macro cells 102b and 102c, and finds that the signal peaks have very different timing, the UE 120a would determine that this synchronization indicator would tend to suggest that the wireless network 100 is asynchronous, in block 703. Conversely, if the UE 120a detects the synchronization signal peaks of the macro cells 102b and 102c are substantially the same, i.e., within a small timing window, then the UE 120a would determine that the wireless network 100 is synchronous, in block 704. Since the UE could falsely detect the presence of synchronization signals, to make the determination of synchronous and asynchronous more robust, the UE may perform additional verification of the initial determination, in block 705, using additional metrics, such as the frequency of detecting the synchronization signal in the same location, RSRP measurements of the cell, and ability to decode channels such as PBCH corresponding to the detected synchronization signal to conform its initial determination.

Cross-Cell Power Detection

It should be noted that when performing analysis of multiple cell or neighbor cell signals, additional cell metrics may be used to either obtain a synchronization indicator or bolster or confirm the obtained indicator. FIG. 8 is a functional block diagram illustrating example blocks to implement one aspect of the present disclosure. For example, after obtaining an initial asynchronous network indication when the multiple detected peaks have different timing, at block 800, the UE 120a may further measure the reference signal receive power (RSRP) of the multiple cells it is searching, at block 801. At block 802, when the RSRP is above the threshold value, which tends to suggest that the cell is truly present, the UE 120a would verify that the wireless network 100 is asynchronous, as the initial determination has been confirmed with additional information, at block 803. Furthermore, the decoded PBCH may serve as an additional cell metric to confirm the cell is present and, hence, confirm the synchronization indicator based on the timing of the synchronization signals. In this aspect, a non-interference cancellation decoding of the PBCH could confirm the synchronization indicator as obtained from the various methods described above.

It should be noted that the analysis of some types of cell metrics may be used to make a determination of either synchronization status, while analysis of other types of cell metrics will only be indicative of one type of synchronization status. For example, while synchronization signal peaks having different timings tend to indicate an asynchronous system, synchronization signal peaks having similar timings or timings that are not substantially different may suggest a synchronous system. However, while an RSRP measured above the threshold corresponding to detected synchronization signals with substantially different timing tends to indicate or suggest an asynchronous system, an RSRP measured below the threshold does not suggest a synchronous system.

Additional Verification Analysis

In an additional aspect of the present disclosure, as the UE 120a performs multiple cell or neighbor cell searches, additional analysis may be used to confirm that the detected cell is actually a cell and not merely a false detection. A false detection of a cell could insert random timing information into the synchronization analysis, which might result in an incorrect synchronization status determination. The UE 120a measuring the RSRP above threshold would indicate that the cell, in fact, exists. Similarly, PBCH decoding may also confirm the presence of the cell. A cell may also be confirmed if the UE 120a keeps detecting the same cell in subsequent searches. Thus, when searching multiple cells or neighbor cells, the detected cells that the UE 120a is not able to confirm will not be used in the synchronization determination.

Interference Cancellation as Detection

In an additional aspect of the present disclosure, the UE 120a may perform multiple cell or neighbor cell searches and analysis using interference cancellation techniques. When the analyses are successful using such interference cancellation techniques, the determination is made that the wireless network 100 is synchronous. Otherwise, the interference cancellation technique would not have succeeded.

In one example of such an aspect that uses interference cancellation, referring again to FIG. 1, the UE 120a searches and analyzes signals in each of the macro cells 102a, 102b, and 102c. In its analysis, the UE 120a finds that the synchronization signal peaks from the macro cells 102a and 102c have similar timing, while the synchronization signal peak from the macro cell 102b has a timing that is substantially different from that in the macro cells 102a and 102c. This synchronization indicator obtained by the UE 120a tends to indicate that the wireless network 100 is, at least, locally synchronous and/or that the macro cell 102b may not be a part of the wireless network 100. However, the UE 120a triggers additional analysis of various cell metrics for the macro cells 102a and 102c using interference cancellation techniques. Based on the results of the analysis of the cell metrics, the UE 120a obtains a more reliable synchronization indicator that it may use to reliably determine the synchronization status of the wireless network 100.

In another example using interference cancellation, macro cells 102a and 102b are synchronous, however, UE 120a searches for the cells and only finds macro cell 102a. The UE 102a performs PSS/SSS interference cancellation of the synchronization signals of macro cell 102a and detects another cell, macro cell 102b, within the timing window of macro cell 102a. Based on finding the weaker of the two cells after interference cancellation, UE 120a is able to determine the network is synchronous.

In still another example using interference cancellation, the network surrounding the UE 120a includes macro cells 102a, 102b, and 102c. Because the signals from macro cells 102a and 102c are seen as stronger by the UE 120a, UE 120a only detects macro cells 102a and 102c. However, the synchronization signal peaks are different enough that the initial determination by UE 120a is that the network is asynchronous. The UE 120a performs interference cancellation of the synchronization signals (e.g., PSS/SSS) and, thereafter, detects macro cell 102b. When analyzing the signal peaks of the macro cell 102b synchronization signals, they are detected within the timing window of macro cell 102a. Thus, UE 120a determines that the network is, at least, locally synchronous.

It should be noted that the analysis of the cell metrics using interference cancellation techniques would include metric analysis such as interference cancellation decoding of the PBCH of the macro cells 102a and 102c. It may also include analyzing the reference signal strength in the macro cells 102a and 102c using interference cancellation. These interference cancellation analyses of cell metrics may also be used in combination with other analyses, such as analysis of the timing updates from time tracking loops of the UE 120a. Additionally, because there still may be false detection of cells, after the interference cancellation is performed, additional analysis may be performed to confirm the presence of the cell, such as through measuring the RS power or decoding the PBCH of the weaker cells after cancelling the PBCH of the stronger cells. In such a situation, if the PBCH of the weaker cells decode successfully and these PBCH signals of the weaker cells pass a cyclic redundancy check (CRC), if the PBCH signals overlap, then the UE 120*a* would determine the wireless network 100 to be synchronous. Thus, the cell metric analysis used by the UE 120*a* in obtaining the synchronization indicator may be a combination of various analyses, including both interference cancellation techniques and non-interference cancellation techniques.

Figure 9:
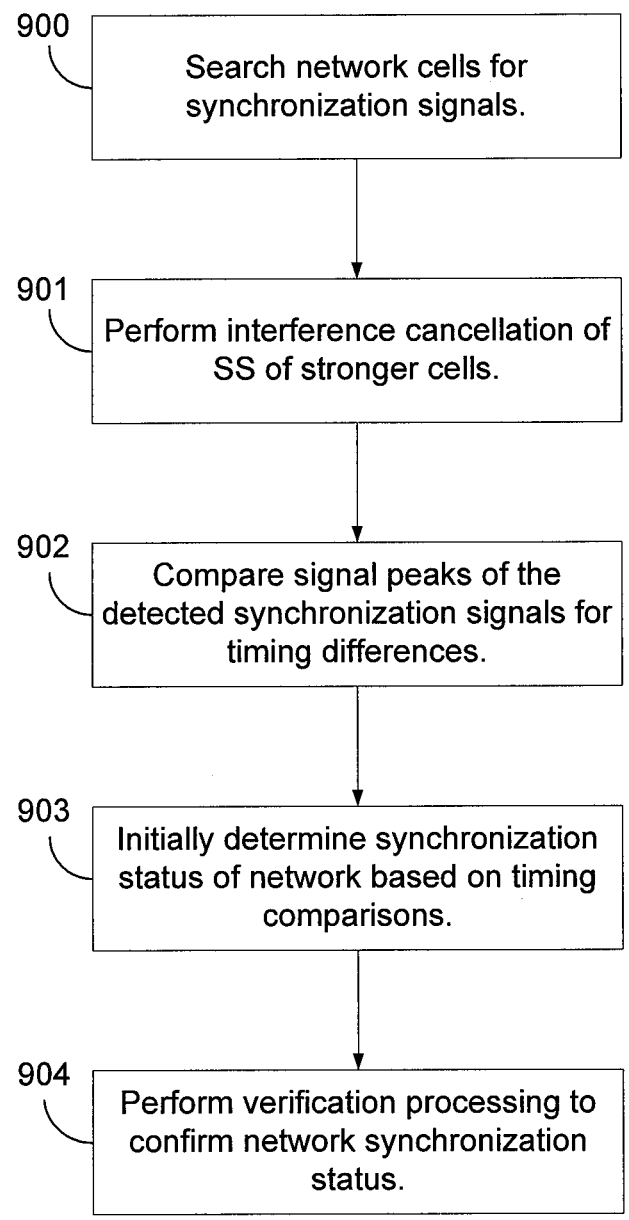

FIG. 9 is a functional block diagram illustrating example blocks executed to implement one aspect of the present disclosure. A UE, such as UE 120*a*, begins, in block 900, by searching network cells for synchronization signals. In some implementations, UE 120*a* performs interference cancellation of the synchronization signals of the stronger cells, in block 901, and continues searching for synchronization signals of the weaker signals. When multiple synchronization signals have been detected, the UE 120*a* compares the signal peaks for timing differences in block 902. UE 120*a* makes an initial determination of the synchronization status of the network, in block 903, based on the timing differences. In block 904, UE 120*a* performs verification processing to confirm the network synchronization status. Such verification processing may include continued detection of synchronization signals and interference cancellation in blocks 900 and 901, PBCH decoding of the cells, RSRP measurements for the cells, and the like. Additionally, when the initial determination is that the network is synchronous, the verification process of block 904 may be improved by attempting detection of PBCH of the weaker cells after performing PBCH and reference signal interference cancellation of the stronger cells or by taking RSRP measurements of the weaker cells after reference signal interference cancellation of the stronger cells, and the like.

It should be noted that in heterogeneous networks, a UE, such as the UE 120*c* may only be able to detect the strongest cell, such as the macro cell 102*c*, using synchronization signals. In such a situation, the UE 120*c* would cancel the synchronization signals received from the macro cell 102*c* and attempt detection again. If additional synchronization signals are detected and cells confirmed against false detection, then the UE 120*c* would tend to determine that the wireless network 100 is synchronous.

Detection Using Cyclic Prefix Positioning

In an additional aspect of the present disclosure, referring again to FIG. 1, the UE 120*a* searches and analyzes the cyclic prefix (CP) positions of the neighbor cells and serving cell, such as the macro cells 102*a*, 102*b*, and 102*c*. For example, the UE 120*a* may reconstruct and subtract the signals of the serving eNB, e.g., the macro eNB 110*a*, from the received sample signals, which may be performed in the time domain, and determine the cross-correlation on the residual time domain samples in order to detect the timing of the multiple peaks, each of which is indicative of the CP position and multipath tap of a dominant interferer for the macro cells 102*b* and 102*c*. This cross-correlation technique leverages the make-up of an OFDM symbol. An OFDM symbol is made up of the CP and data portions. The CP portion is a part of the data portion which is repeated. Therefore, the timing may be found by correlating the CP. For each CP timing hypothesis, the UE 120*a* selects received signal samples that would correspond to the CP. This selection is then correlated with the received signal samples in the data portion that was repeated in the CP. These correlations for the same CP timing hypothesis across multiple OFDM symbols may be combined to obtain a new combined correlation metric. The timing associated with the largest of these combined correlation metrics would typically correspond to the timing of the strongest detected cell, while the timing corresponding to other large values of the correlation would correspond to the other multipath component of the strongest cell or to symbol boundaries of other cells. Based on these correlations, the UE would determine which correlations are valid symbol boundaries and which are false symbol boundary detections. The UE may make this determination, for example, by only considering the timing hypotheses that have correlations larger than a threshold value. If all of the valid symbol boundary hypotheses are within a certain window, the UE would determine that the network is synchronous, and if the valid symbol boundary hypotheses are substantially different, the UE would determine that the network is asynchronous.

It should be noted that the UE may obtain more reliable estimates of the symbol boundary of weaker cells by cancelling some of the signals from the stronger cells and detect the weaker cell CP position using the samples after interference cancellation.

It should further be noted that, when operating in a synchronous mode, a UE, such as the UE 120*a*, may limit the searches of the synchronization signals of the neighbor cells to a defined window around the timing of the cells that the UE 120*a* is tracking or, alternatively, around the timing of the strongest cells. In such aspects, a full neighbor search may be performed occasionally in order to detect synchronization status, as the UE 120*a* is moving, and the synchronization of the cell in which the UE 120*a* is located may change over time.

Turning again to FIG. 1, in an additional aspect of the present disclosure, the multiple cell analysis techniques used to determine the synchronization status in a heterogeneous network that incorporates multiple micro cells, such as pico or femto cells, within the cover area of the macro cell. For example, the macro cells 102*a*, 102*b*, and 102*c* are heterogeneous networks that include micro cells, such as the femto cells 110*y* and 110*z*, a relay station 110*r*, and a pico cell 110*x*. The macro cell 102*c* is synchronized with the femto cells 102*y* and 102*z*. Thus, the signals from each of the macro cell 102*c*, and the femto cells 102*y* and 102*z* may be received by the UE 120*c* within a tolerable timing difference. However, in operation, the signals from a neighboring macro cell, such as the macro cell 102*a*, may be received with a large timing offset, possibly due to propagation delays or the network may only be locally synchronous. This large timing offset would create the appearance to the UE 120*c*, that the wireless network 100 is asynchronous. In such instances, the UE 120*c* may apply interference cancellation to the strongest detected cells of the cells which appear to be synchronous. For example, if the strongest cell detected by the UE 120*c* is the femto cell 110*y*, to which it cannot connect, the UE 120*c* assumes that there is at least one macro cell that will be synchronous to the femto cell 110*y*. The UE 120*c* would, therefore, perform localized interference cancellation in order to communicate with the macro cell 110*c*.

Figure 10:
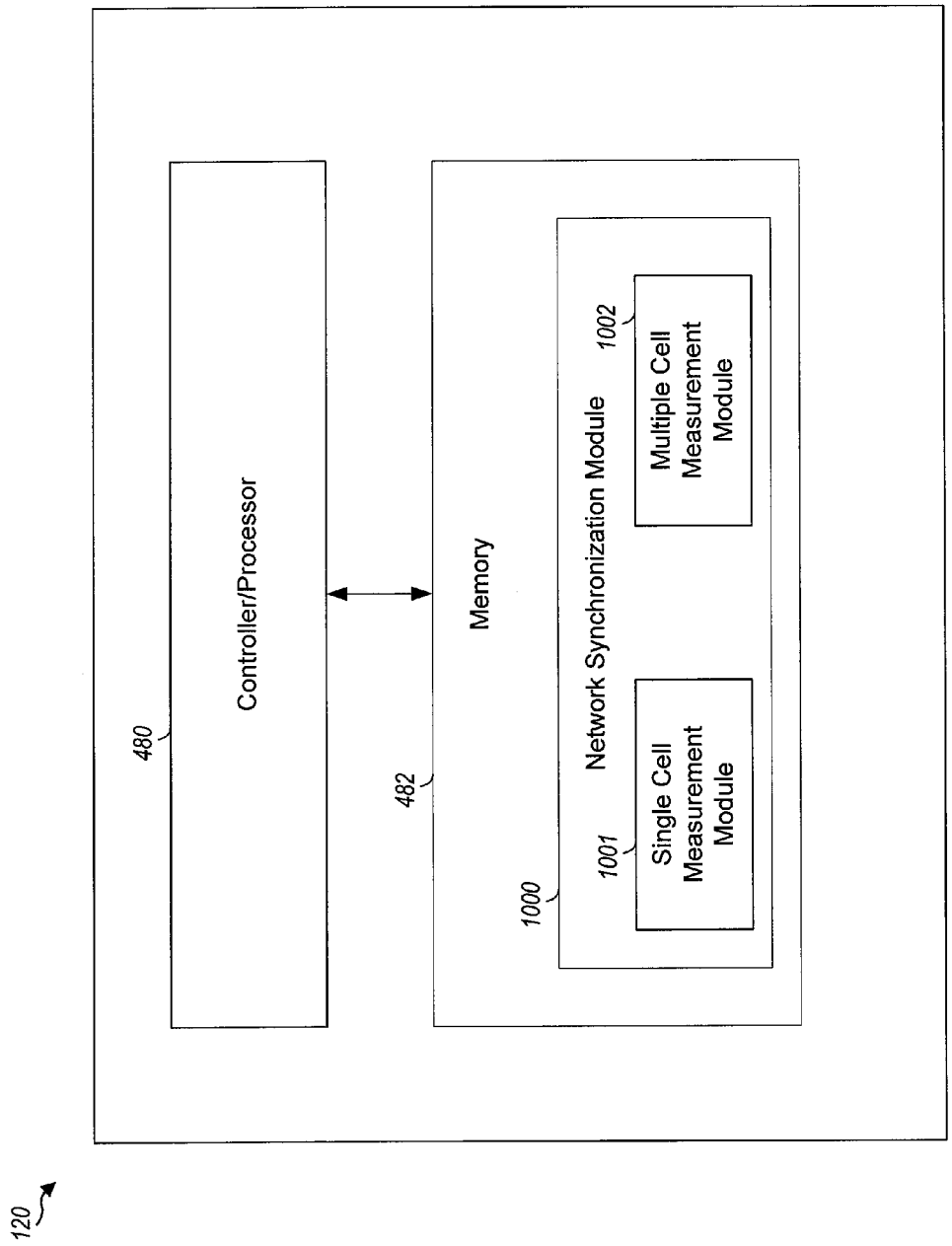
FIG. 10 is a block diagram illustrating a UE configured according to one aspect of the present disclosure.

FIG. 10 is a block diagram illustrating a UE 120 configured according to one aspect of the present disclosure. The UE 120 includes, among other things, a controller/processor 480, and a memory 482, as described with respect to FIG. 1. In order to implement the network synchronization analysis, a network synchronization module 1000 is stored on the memory 482. The network synchronization module 1000 includes submodules for performing the synchronization analysis within a single cell, a single cell measurement module 1001, and for performing the synchronization analysis with multiple cells or neighbor cells, a multiple cell measurement module 1002.

In operation, when executed by the controller/processor 480, the single cell measurement module 1001 of the network synchronization module 1000 stored in memory 482 configures the UE 120 to obtain a synchronization indicator by detecting or analyzing signals from the serving cell, as described with respect to the various examples illustrated in FIG. 5. When executed by the controller/processor 480, the multiple cell measurement module 1002 of the network synchronization module 1000 stored in memory 482 configures the UE 120 to obtain a synchronization indicator by searching and analyzing multiple cells or neighbor cells and the serving cell, as described with respect to the various examples illustrated in FIG. 1. Based on the synchronization indicator obtained, the executing network synchronization module 1000 configures the UE 120 to determine the synchronization status of the network.

Figure 11:
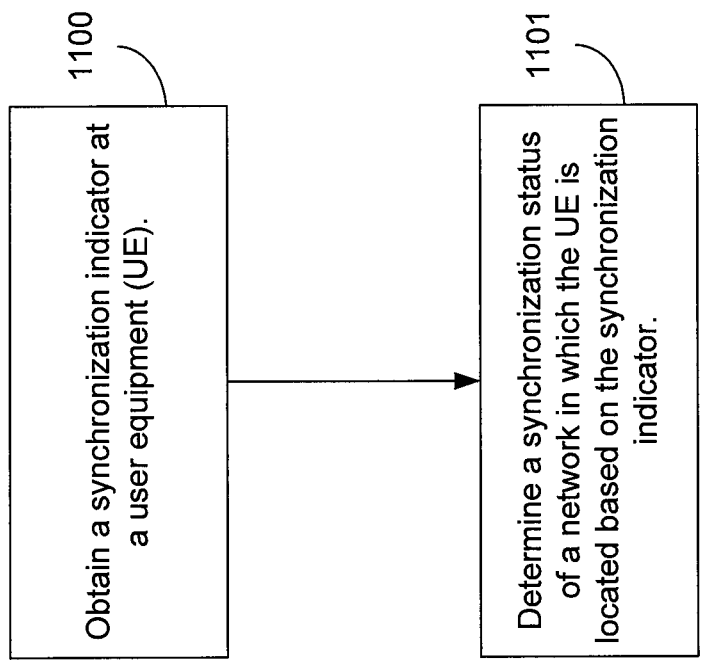
FIG. 11 is a functional block diagram illustrating example blocks executed to implement one aspect of the present disclosure.

FIG. 11 is a functional block diagram illustrating example blocks executed to implement one aspect of the present disclosure. In block 1100, a UE obtains a synchronization indicator from a sample of signals. The UE then determines a synchronization status of a network in which the UE is located, in block 1101, based on the synchronization indicator. The functional blocks described and illustrated in FIG. 11 may be executed as a part of the network synchronization module 1000 (FIG. 10) as executed by the controller/processor 480 (FIG. 4).

It should be noted that the techniques described in the various example aspects of the present disclosure may be applied to detecting synchronization on different levels. For example, on the radio frame level, synchronization may be a collision between subframe 0 of one cell and subframe 0 of another cell. Synchronization may also be on the subframe level where, for instance, subframes of different cells appear at the same time but, subframe 0 of one cell collides with subframe 1 of the other cell. Synchronization may also be on the OFDM symbol level. Accordingly, the teachings of the present disclosure are not limited to application of only radio level synchronization.

In one configuration, the UE 120 configured for wireless communication includes means for obtaining a synchronization indicator at a UE and means for determining a synchronization status of a network in which the UE is located based on the synchronization indicator. In one aspect, the aforementioned means may be the processor(s), the controller/processor 480, the memory 482, the receive processor 458, the MIMO detector 456, the demodulators 454*a*, and the antennas 452*a* configured to perform the functions recited by the aforementioned means. In another aspect, the aforementioned means may be a module or any apparatus configured to perform the functions recited by the aforementioned means.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The functional blocks and modules in FIGS. 6A-9 and 11 may comprise processors, electronics devices, hardware devices, electronics components, logical circuits, memories, software codes, firmware codes, etc., or any combination thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both non-transitory computer storage media and communication media including any medium that facilitates transfer of a computer program from one place to another. A non-transitory storage media may be any available media that can be accessed by a general purpose or special purpose computer. By way of example, and not limitation, such non-transitory computer-readable media can comprise RAM, ROM, EEPROM, CD-ROM or other optical disk storage, magnetic disk storage or other magnetic storage devices, or any other medium that can be used to store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method for wireless communications, said method comprising:
   obtaining a synchronization indicator, at a user equipment (UE) located within a cell of a network, from a detected signal, wherein the synchronization indicator comprises information indicative of synchronization of the cell with respect to one of: a synchronous network or an asynchronous network;
   determining a synchronization status of the network in which said UE is located based on said synchronization indicator; and
   operating in one of: a synchronous mode of operation or an asynchronous mode of operation, in response to the determined synchronization status of the network.

2. The method of claim 1, wherein said obtaining comprises:
   detecting a signal broadcast by an evolved node B (eNB) of said network in which said UE is located, wherein said signal is indicative of said synchronization status.

3. The method of claim 1, wherein said obtaining comprises:
   receiving a unicast signal from an evolved node B (eNB), wherein said unicast signal is indicative of said synchronization status.

4. The method of claim 1, wherein said obtaining comprises:
   detecting resource partitioning in said network, wherein said detecting said resource partitioning indicates a synchronous network.

5. The method of claim 1, wherein said obtaining comprises:
   periodically searching for a plurality of cells of said network, for said synchronization indicator.

6. The method of claim 5, wherein, based on said synchronization indicator, selecting to perform at least one of: reference signal interference cancellation, synchronization signal interference cancellation, and broadcast channel interference cancellation.

7. The method of claim 5, wherein said searching comprises:
   measuring at least two synchronization signal peaks corresponding to at least two cells of said plurality of cells, wherein, responsive to said at least two synchronization signal peaks having substantially different timing, said synchronization indicator obtained from said measuring suggests said synchronization status as asynchronous.

8. The method of claim 7, further comprising:
   measuring a cell metric related to one of said at least two cells, said cell metric comprising one or more of: a reference signal receive power (RSRP) and timing updates of time tracking loop (TTL), wherein said measured cell metric is used to confirm said suggestion of said synchronization indicator.

9. The method of claim 7, further comprising:
   decoding a broadcast channel associated with said at least two synchronization signal peaks corresponding to said at least two cells, wherein said decoded broadcast channel is used to confirm said suggestion of said synchronization indicator.

10. The method of claim 5, wherein said searching comprises:
    measuring at least two synchronization signal peaks corresponding to at least two cells of said plurality of cells, wherein, responsive to said at least two synchronization signal peaks having substantially similar timing, said synchronization indicator obtained from said measuring suggests said synchronization status as synchronous.

11. The method of claim 10, further comprising:
    measuring a cell metric related to one of said at least two cells, wherein said measured cell metric is used to confirm said suggestion of said synchronization indicator.

12. The method of claim 10, further comprising:
    decoding a broadcast channel for at least one neighbor cell, wherein said decoded broadcast channel is used to confirm said suggestion of said synchronization indicator.

13. The method of claim 12, wherein said decoding of said broadcast channel of a weaker cell of said at least two cells is performed after cancellation of said broadcast channel and reference signals of a stronger cell of said at least two cells.

14. The method of claim 1, wherein said obtaining comprises:
    detecting cyclic-prefix (CP) positions of at least two cells of a plurality of cells of said network; and
    comparing said CP positions of one of said at least two cells against said CP position of another of said at least two cells, wherein said synchronization indicator is based on said comparing.

15. The method of claim 1, further comprising:
    detecting symbol timing boundaries for at least two cells of a plurality of cells of said network by searching for each likely location of cyclic-prefix (CP) position; and
    comparing boundaries of the detected symbol timing, wherein said network is determined synchronous when one of:
       only one symbol timing is detected; and
       a plurality of symbol timings are detected, wherein said plurality of symbol timings differ by an amount smaller than a threshold value; and
    wherein said network is determined asynchronous when a plurality of symbol timings are detected, wherein said plurality of symbol timings differ by a second amount larger than said threshold value.

16. The method of claim 15, wherein said searching for each likely location of CP position comprises:
    correlating, for different hypothesis symbol timings, a CP part of a received signal with a portion of a received orthogonal frequency multiplexing (OFDM) symbol that contained a same signal as was transmitted on said CP; and
    determining said each likely location of said CP position based on said correlating.

17. The method of claim 1, wherein said obtaining comprises:
    periodically searching at least two cells of a plurality of cells of said network for said synchronization indicator; and
    measuring for at least one synchronization signal peak in a predetermined window around a reference synchronization signal peak of at least a strongest cell monitored by said UE, wherein said synchronization indicator is obtained based on a comparison of said measured at least one synchronization signal peak and said reference synchronization signal peak.

18. The method of claim 17, wherein said periodic searching and measuring for a weaker cell of said at least two cells is performed after cancellation of synchronization signals of a stronger cell of said at least two cells.

19. The method of claim 17, further comprising:
periodically measuring for said at least one synchronization signal peak in each of said at least two cells, wherein said synchronization indicator is obtained based on a comparison of said measured at least one synchronization signal peak in each of said at least two cells and said reference synchronization signal peak.

20. The method of claim 1 wherein said obtaining comprises:
periodically searching at least two cells of a plurality of cells of said network for said synchronization indicator;
discovering said synchronization indicator suggests said synchronization status between said at least two cells; and
measuring at least one cell metric of at least one micro cell within one of said at least two cells, said at least one micro cell is synchronous to said one of said at least two cells, wherein said measured at least one cell metric is used to confirm said synchronization indicator.

21. An apparatus configured for wireless communication, said apparatus comprising:
means for obtaining a synchronization indicator, at a user equipment (UE) located within a cell of a network, from a detected signal, wherein the synchronization indicator comprises information indicative of synchronization of the cell with respect to one of: a synchronous network or an asynchronous network;
means for determining a synchronization status of the network in which said UE is located based on said synchronization indicator; and
means for operating in one of: a synchronous mode of operation or an asynchronous mode of operation, in response to the determined synchronization status of the network.

22. The apparatus of claim 21, wherein said means for obtaining comprises:
means for periodically searching for a plurality of cells of said network, for said synchronization indicator.

23. The apparatus of claim 21, wherein said means for obtaining comprises:
means for detecting cyclic-prefix (CP) positions of at least two cells of a plurality of cells of said network; and
means for comparing said CP positions of one of said at least two cells against said CP position of another of said at least two cells, wherein said synchronization indicator is based on said comparing.

24. The apparatus of claim 21, wherein said means for obtaining comprises:
means for detecting symbol timing boundaries for at least two cells of a plurality of cells of said network by searching for each likely location of cyclic-prefix (CP) position; and
means for comparing boundaries of the detected symbol timing, wherein said network is determined synchronous when one of:
only one symbol timing is detected; and
a plurality of symbol timings are detected, wherein said plurality of symbol timings differ by an amount smaller than a threshold value; and
wherein said network is determined asynchronous when a plurality of symbol timings are detected, wherein said plurality of symbol timings differ by a second amount larger than said threshold value.

25. The apparatus of claim 21, wherein said means for obtaining comprises:
means for periodically searching at least two cells of a plurality of cells of said network for said synchronization indicator;
means for discovering said synchronization indicator suggests said synchronization status between said at least two cells; and
measuring at least one cell metric of at least one micro cell within one of said at least two cells, said at least one micro cell is synchronous to said one of said at least two cells, wherein said measured at least one cell metric is used to confirm said synchronization indicator.

26. A computer program product for wireless communications in a wireless network, comprising:
a non-transitory computer-readable medium having program code recorded thereon, said program code comprising:
program code to obtain a synchronization indicator, at a user equipment (UE) located within a cell of a network, from a detected signal, wherein the synchronization indicator comprises information indicative of synchronization of the cell with respect to one of: a synchronous network or an asynchronous network;
program code to determine a synchronization status of the network in which said UE is located based on said synchronization indicator; and
program code to operate in one of: a synchronous mode of operation or an asynchronous mode of operation, in response to the determined synchronization status of the network.

27. The UE of claim 26, wherein said program code to obtain comprises:
program code to periodically search for a plurality of cells of said network, for said synchronization indicator.

28. The UE of claim 26, wherein said program code to obtain comprises:
program code to detect cyclic-prefix (CP) positions of at least two cells of a plurality of cells of said network; and
program code to compare said CP positions of one of said at least two cells against said CP position of another of said at least two cells, wherein said synchronization indicator is based on said comparison.

29. The UE of claim 26, wherein said program code to obtain comprises:
program code to detect symbol timing boundaries for at least two cells of a plurality of cells of said network by searching for each likely location of cyclic-prefix (CP) position; and
program code to compare boundaries of the detected symbol timing, wherein said network is determined synchronous when one of:
only one symbol timing is detected; and
a plurality of symbol timings are detected, wherein said plurality of symbol timings differ by an amount smaller than a threshold value; and
wherein said network is determined asynchronous when a plurality of symbol timings are detected, wherein said plurality of symbol timings differ by a second amount larger than said threshold value.

30. The UE of claim 26, wherein said program code to obtain comprises:
   program code to periodically search at least two cells of a plurality of cells of said network for said synchronization indicator;
   program code to discover said synchronization indicator suggests said synchronization status between said at least two cells; and
   program code to measure at least one cell metric of at least one micro cell within one of said at least two cells, said at least one micro cell is synchronous to said one of said at least two cells, wherein said measured at least one cell metric is used to confirm said synchronization indicator.

31. A user equipment (UE) configured for wireless communication, said UE comprising:
   at least one processor; and
   a memory coupled to said at least one processor;
   wherein said at least one processor is configured:
      to obtaining a synchronization indicator at a user equipment (UE) located within a cell of a network, from a detected signal, wherein the synchronization indicator comprises information indicative of synchronization of the cell with respect to one of: a synchronous network or an asynchronous network;
      to determine a synchronization status of the network in which said UE is located based on said synchronization indicator; and
      to operate in one of: a synchronous mode of operation or an asynchronous mode of operation, in response to the determined synchronization status of the network.

32. The UE of claim 31, wherein said configuration of said at least one processor to obtain comprises configuration of said at least one processor:
   to detect a signal broadcast by an evolved node B (eNB) of said network in which said UE is located, wherein said signal is indicative of said synchronization status.

33. The UE of claim 31, wherein said configuration of said at least one processor to obtain comprises configuration of said at least one processor:
   to receive a unicast signal from an evolved node B (eNB), wherein said unicast signal is indicative of said synchronization status.

34. The UE of claim 31, wherein said configuration of said at least one processor to obtain comprises configuration of said at least one processor:
   to detect resource partitioning in said network, wherein said detecting said resource partitioning indicates a synchronous network.

35. The UE of claim 31, wherein said configuration of said at least one processor to obtain comprises configuration of said at least one processor:
   to periodically search for a plurality of cells of said network, for said synchronization indicator.

36. The UE of claim 35, wherein, based on said synchronization indicator, said at least one processor is further configured to select to perform at least one of: reference signal interference cancellation, synchronization signal interference cancellation, and broadcast channel interference cancellation.

37. The UE of claim 35, wherein said configuration of said at least one processor to search comprises configuration of said at least one processor:
   to measure at least two synchronization signal peaks corresponding to at least two cells of said plurality of cells, wherein, responsive to said at least two synchronization signal peaks having substantially different timing, said synchronization indicator obtained from said measuring suggests said synchronization status as asynchronous.

38. The UE of claim 37, wherein said at least one processor is further configured:
   to measure a cell metric related to one of said at least two cells, said cell metric comprising one or more of: a reference signal receive power (RSRP) and timing updates of time tracking loop (TTL), wherein said measured cell metric is used to confirm said suggestion of said synchronization indicator.

39. The UE of claim 37, wherein said at least one processor is further configured:
   to decode a broadcast channel associated with said at least two synchronization signal peaks corresponding to said at least two cells, wherein said decoded broadcast channel is used to confirm said suggestion of said synchronization indicator.

40. The UE of claim 35, wherein said configuration of said at least one processor to search comprises configuration of said at least one processor:
   to measure at least two synchronization signal peaks corresponding to at least two cells of said plurality of cells, wherein, responsive to said at least two synchronization signal peaks having substantially similar timing, said synchronization indicator obtained from said measuring suggests said synchronization status as synchronous.

41. The UE of claim 40, wherein said at least one processor is further configured:
   to measure a cell metric related to one of said at least two cells, wherein said measured cell metric is used to confirm said suggestion of said synchronization indicator.

42. The UE of claim 40 wherein said at least one processor is further configured:
   to decode a broadcast channel for at least one neighbor cell, wherein said decoded broadcast channel is used to confirm said suggestion of said synchronization indicator.

43. The UE of claim 42 wherein said configuration of said at least one processor to decode said broadcast channel of a weaker cell of said at least two cells is conducted after cancellation of said broadcast channel and reference signals of a stronger cell of said at least two cells.

44. The UE of claim 31, wherein said configuration of said at least one processor to obtain comprises configuration of said at least one processor:
   to detect cyclic-prefix (CP) positions of at least two cells of a plurality of cells of said network; and
   to compare said CP positions of one of said at least two cells against said CP position of another of said at least two cells, wherein said synchronization indicator is based on said comparison.

45. The UE of claim 31, wherein said configuration of said at least one processor to obtain comprises configuration of said at least one processor:
   to detect symbol timing boundaries for at least two cells of a plurality of cells of said network by searching for each likely location of cyclic-prefix (CP) position; and
   to compare boundaries of the detected symbol timing, wherein said network is determined synchronous when one of:
      only one symbol timing is detected; and
      a plurality of symbol timings are detected, wherein said plurality of symbol timings differ by an amount smaller than a threshold value; and
   wherein said network is determined asynchronous when a plurality of symbol timings are detected, wherein said plurality of symbol timings differ by a second amount larger than said threshold value.

46. The UE of claim 45, wherein configuration of said at least one processor to search for each likely location of CP position comprises configuration:
- to correlate, for different hypothesis symbol timings, a CP part of a received signal with a portion of a received orthogonal frequency multiplexing (OFDM) symbol that contained a same signal as was transmitted on said CP; and
- to determine said each likely location of said CP position based on said correlation.

47. The UE of claim 31, wherein said configuration of said at least one processor to obtain comprises configuration of said at least one processor:
- to periodically search at least two cells of a plurality of cells of said network for said synchronization indicator; and
- to measure for at least one synchronization signal peak in a predetermined window around a reference synchronization signal peak of at least a strongest cell monitored by said UE, wherein said synchronization indicator is obtained based on a comparison of said measured at least one synchronization signal peak and said reference synchronization signal peak.

48. The UE of claim 47, wherein configuration of said at least one processor to periodically search and measure for a weaker cell of said at least two cells is conducted after cancellation of synchronization signals of a stronger cell of said at least two cells.

49. The UE of claim 47, wherein said at least one processor is further configured:
- to periodically measure for said at least one synchronization signal peak in each of said at least two cells, wherein said synchronization indicator is obtained based on a comparison of said measured at least one synchronization signal peak in each of said at least two cells and said reference synchronization signal peak.

50. The UE of claim 31 wherein said configuration of said at least one processor to obtain comprises configuration of said at least one processor:
- to periodically search at least two cells of a plurality of cells of said network for said synchronization indicator;
- to discover said synchronization indicator suggests said synchronization status between said at least two cells; and
- to measure at least one cell metric of at least one micro cell within one of said at least two cells, said at least one micro cell is synchronous to said one of said at least two cells, wherein said measured at least one cell metric is used to confirm said synchronization indicator.

* * * * *